United States Patent [19]

Nakagawa

[11] 4,294,532
[45] Oct. 13, 1981

[54] SHUTTER BLADE DEVICE FOR FOCAL PLANE SHUTTER

[75] Inventor: Tadashi Nakagawa, Shikawatashi, Japan

[73] Assignee: Seiko Koki Kabushiki Kaisha, Tokyo, Japan

[21] Appl. No.: 143,008

[22] Filed: Apr. 23, 1980

[30] Foreign Application Priority Data

Apr. 24, 1979 [JP] Japan .................................. 54/51085

[51] Int. Cl.³ .............................................. G03B 9/40
[52] U.S. Cl. .................................................... 354/246
[58] Field of Search ......................... 352/236, 245–249

[56] References Cited

U.S. PATENT DOCUMENTS 2,890,638 6/1959 Rentschler ...................... 354/247 X
3,502,014 3/1970 Atake ............................. 354/236 X
3,635,142 1/1972 Ataka et al. .................... 354/236 X
4,054,891 10/1977 Onda et al. ..................... 354/249 X
4,096,505 6/1978 Onda et al. ......................... 354/246

Primary Examiner—Donald A. Griffin
Attorney, Agent, or Firm—Robert E. Burns; Emmanuel J. Lobato; Bruce L. Adams

[57] ABSTRACT

In a focal plane shutter for a single lens reflex camera having, on the side of the shutter aperture, two blade groups each consisting of a plurality of separate blades adapted to operate sequentially in exposure operation, a shutter blade device includes said two blade groups having at least some of blades formed of thin synthetic resin plates. A shielding member is provided between a reflex mirror and said blade groups and adapted to retract from an aperture shielding position during the exposure operation of said two blade groups and return to an aperture shielding position before and after the exposure operation.

8 Claims, 4 Drawing Figures

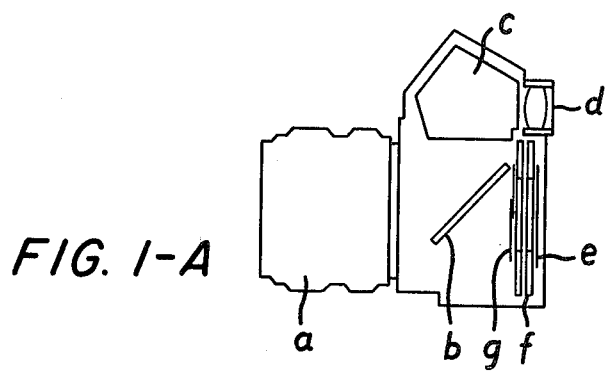
FIG. 1-A
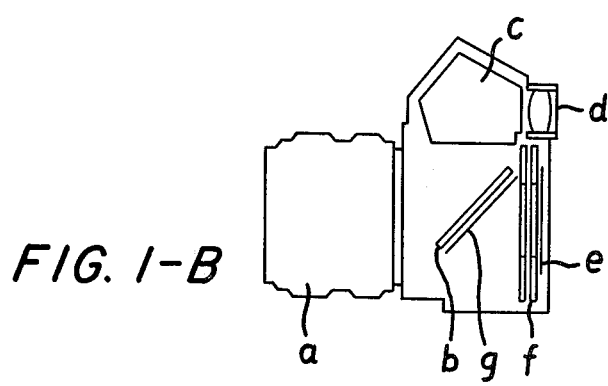
FIG. 1-B
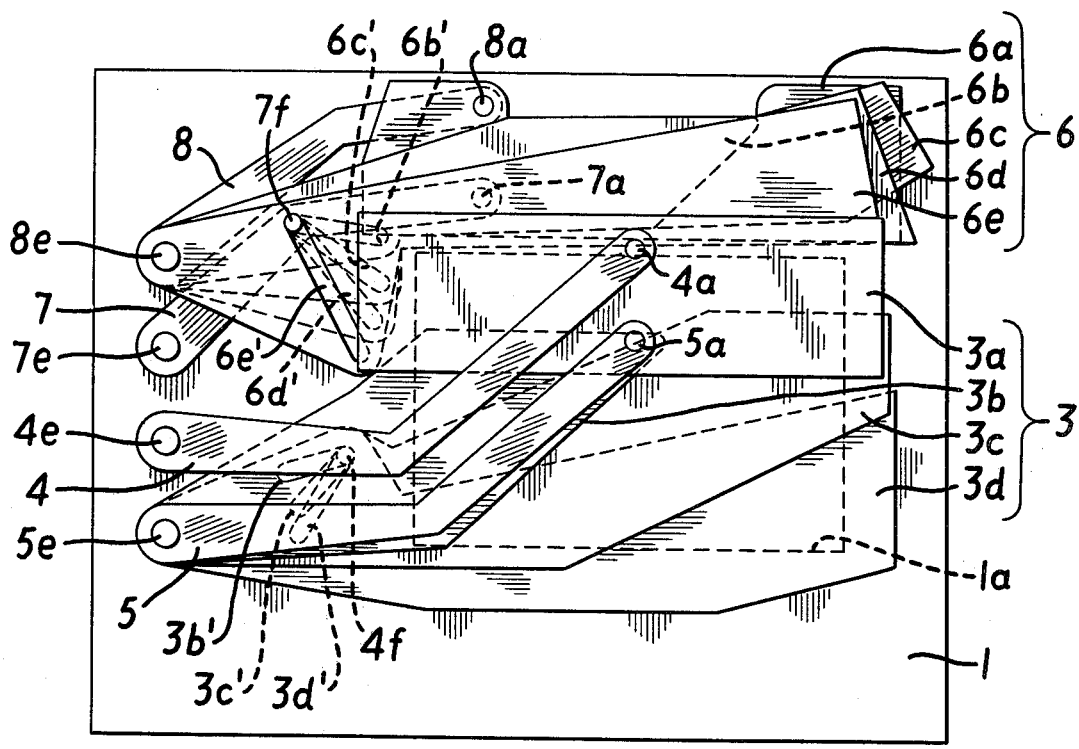
FIG. 2

SHUTTER BLADE DEVICE FOR FOCAL PLANE SHUTTER

BACKGROUND OF THE INVENTION

This invention relates to a shutter blade device of the focal plane shutter for a camera.

A well-known focal plane shutter has two blade groups on the side of the exposure aperture, each blade group comprising a plurality of separate shutter blades, and controls exposure by sequentially operating those shutter blades. The conventional shutter blades of the type mentioned have disadvantages that they require a large operating torque due to their large inertia, make a stopping noise and give a shock to the camera as the shutter blades are formed of suitably shaped thin metallic plates.

Furthermore, the focal plane shutter has a possibility that the shutter is damaged by burning becoming, inoperative or losing the shielding function as the sun light is focused near the shutter plane.

SUMMARY OF THE INVENTION

Accordingly, an object of the present invention is to provide a focal plane shutter having exposure shutter blades formed of light and thin plates of a synthetic resin to reduce the inertia of the blades, consequently, to reduce operating noise and shock, and at the same time, to prevent malfunction caused by burning damage.

According to the present invention, the exposure shutter blades of the two blade groups are formed of light and thin plates of a synthetic resin, and an additional blade device is provided for covering the exposure shutter blades before and after exposure operation, thus securing satisfactory operation of the exposure shutter blades, reducing operating noise and shock and preventing the burning of the exposure shutter blades.

BRIEF DESCRIPTION OF THE DRAWINGS

FIGS. 1-A and 1-B are sectional views of single lens reflex cameras equipped with a first and a second embodiment according to the present invention, respectively, FIG. 2 is a plan view of a shutter of this invention in a charged state illustrating the positions of shutter blades.

Figure 3:
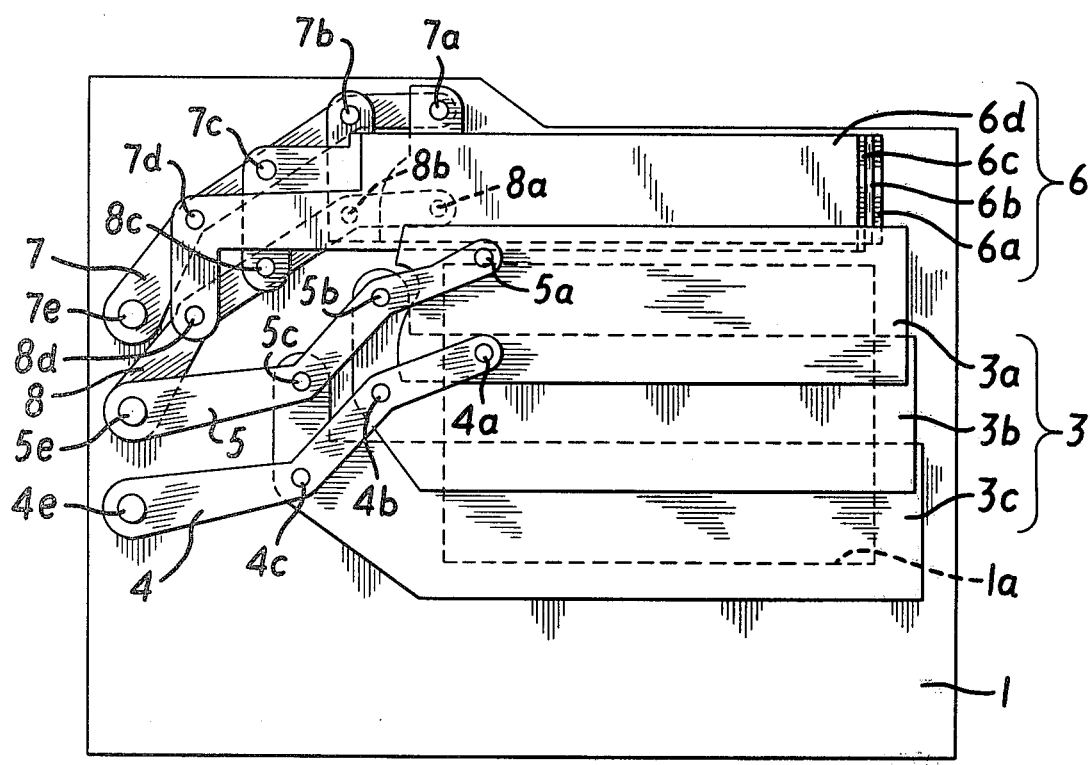
FIG. 3 is a plan view of another embodiment of this invention illustrating the position of respective blades in a charged position.

In the drawings, reference numerals designate; (1): a base plate, (2): a holding plate, (3): an opening blade group, and (6): a closing blade group.

DETAILED DESCRIPTION OF THE INVENTION

FIG. 1 is a sectional view of a single lens reflex camera equipped with a shutter of the present invention. Referring to FIG. 1, there are illustrated a lens (a), a mirror (b), a prism (c), a range finder (d), a film (e), a shutter (f) and a shielding member (g). FIG. 1-A illustrates a first embodiment of the invention and FIG. 1-B is a second embodiment of the invention. The shielding member (g) is disposed in front of the shutter (f) shielding the exposure aperture and retracted from the exposure aperture simultaneously with lifting of the mirror (b), then returns to the initial position after the completion of exposure as shown in FIG. 1.

FIG. 2 is a plan view of a shutter of this invention in a charged state illustrating the positions of shutter blades. In FIG. 2, an exposure aperture (1a) is formed on a base plate (1). A holding plate (2), which defines a shutter blade operating space for opening and closing the aperture, is formed in a shape similar to the base plate (1) and provided with an aperture (2a) corresponding to the aperture (1a) and fixed to the base plate (1) by a known means, however, it is not illustrated to simplify the explanation. An opening blade group (3) which opens the aperture (1a) in the exposure operation comprises four blades such as an opening slit forming blade (3a) and shielding blades (3b), (3c) and (3d). The slit forming blade (3a) is attached to an opening arm (4) and an auxiliary opening arm (5) on the opposite side thereof by pivots (4a) and (5a), respectively, and the opening arm (4) and the auxiliary opening arm (5) are pivoted on pivots (4e) and (5e) fixed on the base plate (1), respectively. The opening arms (4), the auxiliary opening arm (5), the pivots (4a), (5a), (4e) and (5e) and the slit forming blade (3) constitute a parallelogram linkage which allows parallel displacement of the slit forming blade (3). The shielding blades (3b), (3c) and (3d) are pivoted on the pivot (5e) of the auxiliary opening arm (5). A pin (4f) projecting on the reverse side of the opening arm (4) in the middle thereof is fitted in slots (3b'), (3c') and (3d') provided on respective shielding blade (3b), (3c) and (3d). A closing blade group (6) which closes the aperture (1a) at the completion of exposure comprises five blades such as a closing slit forming blade (6a) and shielding blades (6b), (6c), (6d) and (6e). These blades of the closing blade group (6) are arranged substantially in the same manner with the opening blade group (3) on the base plate (1); the closing slit forming blade (6a) is attached to a closing arm (7) and an auxiliary closing arm (8) on the opposite side thereof by pivots (7a) and (8a), respectively, and the closing arm (7) and the auxiliary closing arm (8) are pivoted on pivots (7e) and (8e) fixed on the base plate (1), respectively, and the shielding blades (6b), (6c), (6d) and (6e) are pivoted on the pivot (8e) of the auxiliary closing arm (8). A pin (7f) projecting on the reverse side of the closing arm (7) in the middle thereof is fitted in slots (6b'), (6c'), (6d') and (6e') provided on respective shielding blade (6b), (6c), (6d) and (6e).

Each blade is formed of a thin plate of an opaque synthetic resin and each arm is formed of a thin metallic plate.

A shielding member (g) is disposed in front of the base plate (1) as shown in FIG. 1-A, however, explanation will be omitted for simplicity as the shielding member (g) is composed similarly to either one of the blade groups as described hereinbefore.

In operation, when the shutter is released after the mirror is lifted and the shielding member (g) of FIG. 1 is retracted interlocking with depression on the shutter releasing button of the camera, restraint, not shown, on the opening arm (4) is cancelled allowing the opening arm (4) to start turning clockwise being urged by a spring force, not shown. Then the opening slit forming blade (3a) is moved downwards in parallel to the aperture (1a) by the parallelogram linkage and the shielding blades (3b), (3c) and (3d) are turned by the pin (4f) projecting from the opening arm (4) and being fitted in the respective slots (3b'), (3c') and (3d') about the pivot (5e) for respective angles corresponding to respective slots.

Thus the opening blade group opens the aperture (1a). When the restraint on the closing arm (7) is cancelled by a known procedure after a desired period of exposure time, the closing arm (7) is allowed to start turning clockwise being urged by a spring force, not shown, so that the closing slit forming blade (6a) is moved downwards in parallel to the aperture (1a) by the parallelogram linkage and the shielding blades (6b), (6c), (6d) and (6e) are turned by the pin (7f) projecting from the closing arm (7) and being fitted in the respective slots (6b'), (6c'), (6d') and (6e') about the pivot (8e) for respective angles corresponding to respective slots. Thus the closing blade group closes the aperture (1a) to complete the exposure. In charging the shutter, the opening arm (4) and the closing arm (7) are turned counterclockwise by known means against the spring force, not shown, until they are restrained at resective positions as shown in FIG. 2.

FIG. 3 is a plan view of another embodiment of this invention illustrating the position of respective blades in the charged state. The disposition and connection of the component members are modified. Shielding blades (3b), (3c), (6b), (6c) and (6d) are attached to respective linkages by pivots (4c), (4a), (5c), (5d), (7c), (7d), (7e), (8c), (8d) and (8e), respectively. An opening blade group (3) and a closing blade group (6) comprise three and four blades, respectively. An auxiliary opening arm (5) and an auxiliary closing arm (8) are pivoted on the same pivot (5e).

Each blade is formed of a thin plate of an opaque synthetic resin and each arm is formed of a thin metallic plate.

Explanation on the operation of the shutter of FIG. 3 will be omitted as the manner of operation is similar to that of FIG. 2.

It will be well understood from what has been described that the shutter of this invention operates lightly and smoothly with reduced inertia and operating torque and reduces operating noise and shock as each blade is formed of a thin plate of a synthetic resin.

Furthermore, the blades are protected from burning by sun light by the shielding member (g) so that the blades are safe from heat deformation which causes malfunction of the blades in an exposure operation. In the construction of FIG. 1-A, burning of the shielding member (g) is possible, however, the exposure control will not be directly affected by the malfunction of the shielding member (g).

In case the shielding member (g) is formed of a thin metallic plate to provide heat resistance, the operating noise and shock are substantially insignificant as the shielding member operates at a relatively slow speed.

In the case of FIG. 1-B, the shielding member (g) is safe from burning as sun light is not focused on the shielding member (g).

Accordingly, in a shutter employing exposure controlling blades formed of thin plates of a synthetic resin to provide light and smooth operation and to reduce operating noise and shock, the prevention of burning of the exposure controlling blades is possible.

Usually, those blades are manufactured by cold punching, therefore, the manufacture of the conventional metallic blades has disadvantages that the tools wear out soon and increased costs are required for the maintenance and tool setting.

Although, the blades of this invention also are manufactured by cold punching, tools wear longer and a minimum cost is required for the maintenance and tool setting in the manufacture of the blades as the blades of this invention are formed of thin plates of a synthetic resin.

Furthermore, According to the present invention, the shielding member (g) functions as a primary shielding means improving the total shielding property of the shutter, therefore, small-sized exposure controlling blades are available and two blade groups are assembled with a minimum overlap, thus providing a small-sized and low-priced shutter.

In the embodiment as shown in FIG. 1-B, the shielding member (g) remains at the position as shown in FIG. 1-B when the mirror (b) is manually shifted out of the light path and is retracted from the light path only by an operation actuated prior to exposure operation. Usually, the mirror (b) of the type is adapted to be shifted out of the light path by manually operating the mirror retaining member and in the normal exposure operation, a mirror driving member operates the mirror retaining member, therefore, the shielding member (g) of this invention will be coupled with the driving member as described above.

What is claimed is:

1. In a focal plane shutter for a single lens reflex camera having on the side of the shutter aperture two blade groups each consisting of a plurality of separate blades adapted to operate sequentially in exposure operation and located adjacent to the focal plane, a shutter blade device for the focal plane shutter including said two blade groups having at least some of blades formed of thin synthetic resin plates, and a reflex mirror, and characterized by a shielding member provided between the reflex mirror and said blade groups and adapted to retract from an aperture shielding position during the exposure operation of said two blade groups and return to an aperture shielding position before and after the exposure operation.

2. A shutter blade device as set forth in claim 1 wherein said shielding member is formed of a plurality of flame retardative thin plates.

3. A shutter blade device as set forth in claim 1 wherein said shielding member is disposed adjacent to the reflex mirror of a single lens reflex camera.

4. A shutter blade device as set forth in claim 3 wherein said shielding member remains inoperative during the manual operation of said reflex mirror and retracts from the aperture shielding position, together with said reflex mirror, prior to the start of the shutter operation.

5. In a single lens reflex camera: means for defining a shutter aperture; a movable reflex mirror; a focal plane shutter comprised of a plurality of movable thin synthetic resin blades for opening and for closing the shutter aperture; and shielding means positioned between said reflex mirror and said focal plane shutter for shielding said focal plane shutter from focused light and for retracting from the position effective to shield said focal plane shutter during exposure and for returning to the position effective to shield said focal plane shutter upon completion of exposure.

6. In a single lens reflex camera according to claim 5, said shielding means comprising movable thermally resistant thin plates.

7. In a single lens reflex camera according to claim 5, said shielding means positioned adjacent said reflex mirror.

8. In a single lens reflex camera according to claim 7, wherein said shielding means retracts from the shielding position together with said reflex mirror prior to shutter opening.

* * * * *